United States Patent
Goto et al.

(10) Patent No.: US 11,030,655 B2
(45) Date of Patent: Jun. 8, 2021

(54) PRESENTING TARGETED CONTENT TO VEHICLE OCCUPANTS ON ELECTRONIC BILLBOARDS

(71) Applicant: International Business Machines Corporation, Armonk, NY (US)

(72) Inventors: Takuya Goto, Tokyo (JP); Kenichi Takasaki, Tokyo (JP); Junta Watanabe, Tokyo (JP); Kenta Watanabe, Soka (JP)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 16/179,153

(22) Filed: Nov. 2, 2018

(65) Prior Publication Data
US 2020/0143422 A1    May 7, 2020

(51) Int. Cl.
*G06Q 30/02* (2012.01)
*G07C 5/02* (2006.01)
(Continued)

(52) U.S. Cl.
CPC ..... *G06Q 30/0265* (2013.01); *G06K 9/00362* (2013.01); *G06Q 30/0254* (2013.01); *G07C 5/008* (2013.01); *G07C 5/02* (2013.01)

(58) Field of Classification Search
CPC . G06Q 30/02; G06Q 30/0241; G06Q 30/0261
(Continued)

(56) References Cited

U.S. PATENT DOCUMENTS 7,620,026 B2 * 11/2009 Anschutz ............... G06Q 30/02
                                                              370/338
9,293,042 B1 * 3/2016 Wasserman ...... H04N 21/42202
(Continued)

FOREIGN PATENT DOCUMENTS

JP       2004-509393 A    3/2004
JP       2014-52518 A     3/2014
(Continued)

OTHER PUBLICATIONS

Satya Mallick, "Head Pose Estimation using OpenCV and Dlib," https://www.learnopencv.com/head-pose-estimation-using-opencv-and-dlib, Sep. 26, 2016, pp. 1-22.
(Continued)

*Primary Examiner* — Saba Dagnew
(74) *Attorney, Agent, or Firm* — Robert A. Voigt, Jr.; Winstead PC

(57) ABSTRACT

A method, system and computer program product for presenting content (e.g., advertisements) to vehicle occupants. An image of the occupants of the vehicle is obtained. The vehicle occupants, such as the driver, are then identified from the image. After obtaining the driving history of the driver, which includes any information that indicates a risk posed to the driver in not paying attention to the road, a risk degree of the driver getting into an accident from viewing content on the electronic billboard is assessed. A "watch ability" of the vehicle occupants to watch content is calculated, based, at least in part, on the driver's risk degree. If the value of the watch ability exceeds a threshold value, then the content preferences of the vehicle occupants are obtained which are used to determine the contents to be presented on the electronic billboard which are targeted to the vehicle occupants.

20 Claims, 9 Drawing Sheets

(51) Int. Cl.
*G07C 5/00* (2006.01)
*G06K 9/00* (2006.01)

(58) Field of Classification Search
USPC ...................................................... 705/14.44
See application file for complete search history.

(56) References Cited

U.S. PATENT DOCUMENTS

| | | | |
|---|---|---|---|
| 9,972,230 B1 | 5/2018 | DeLorean | |
| 2011/0161163 A1* | 6/2011 | Carlson | G06Q 30/0245 |
| | | | 705/14.44 |
| 2011/0238289 A1 | 9/2011 | Lehmann et al. | |
| 2013/0060642 A1* | 3/2013 | Shlomot | G06Q 30/0241 |
| | | | 705/14.66 |
| 2015/0220992 A1* | 8/2015 | Brown | G06Q 30/0261 |
| | | | 705/14.58 |
| 2018/0047056 A1 | 2/2018 | Kim et al. | |

FOREIGN PATENT DOCUMENTS

| | | |
|---|---|---|
| JP | 2016-66358 A | 4/2016 |
| WO | 2013179359 A1 | 12/2013 |
| WO | 2017040924 A1 | 3/2017 |
| WO | 2018053252 A1 | 3/2018 |

OTHER PUBLICATIONS

GitHub, "Face-Landmark-Localization," https://github.com/guozhongluo/head-pose-estimation-and-face-landmark, 2018, pp. 1-4.

* cited by examiner

PRESENTING TARGETED CONTENT TO VEHICLE OCCUPANTS ON ELECTRONIC BILLBOARDS

TECHNICAL FIELD

The present invention relates generally to presenting content (e.g., advertisements) on electronic billboards, and more particularly to presenting targeted content (e.g., advertisements) to vehicle occupants on electronic billboards while taking into consideration the risk of the driver of the vehicle getting into an accident from watching content (e.g., an advertisement).

BACKGROUND

Conventionally, advertisements may be presented on an outdoor billboard, which may be located off a street or highway for vehicle occupants to view. Billboard advertisements are designed to catch a person's attention and create a memorable impression very quickly, leaving the reader thinking about the advertisement after they have driven past it. They have to be readable in a very short time because they are usually read while being passed at high speeds. Thus, there are usually only a few words, in large print, and a humorous or arresting image in brilliant color.

In recent years, electronic billboards (also referred to as "digital billboards") have been used to present advertisements. Electronic billboards are billboards that show varying imagery and text created from computer programs and software. Electronic billboards can be designed to display running text, display several different advertisements from the same company, and even provide several companies a certain time slot during the day. The constantly changing texts ensure maximum impact and wide exposure to target audiences. The ability to schedule advertisements remotely, in combination with flexible real-time scheduling, has allowed for a decrease in traditional upkeep and maintenance costs.

While electronic billboards dynamically change advertisements, such advertisements are not necessarily individually targeted to the occupants of a vehicle traveling passed the electronic billboard. As a result, the advertisements may not be effective in garnering the interest of the driver and/or passenger.

Furthermore, the advertisements shown on the electronic billboard may pose a risk in the driver getting into an accident from paying too close attention to the advertisement displayed on the electronic billboard as opposed to paying attention to the road.

There is currently no means for taking into account the amount of risk that a driver may get into an accident based on not paying attention to the road when presenting advertisements on electronic billboards. That is, there is currently no means for taking into account the risk of distraction of the driver when presenting advertisements on electronic billboards.

SUMMARY

In one embodiment of the present invention, a method for presenting content to vehicle occupants comprises obtaining an image of occupants of a vehicle, where the vehicle occupants comprise a driver of the vehicle. The method further comprises identifying the vehicle occupants from the image. The method additionally comprises obtaining a driving history of the driver of the vehicle. Furthermore, the method comprises assessing a risk degree of the driver getting into an accident based on the driving history. Additionally, the method comprises calculating a watch ability of the vehicle occupants of the vehicle to watch contents on an electronic billboard based on the risk degree of the driver getting into the accident. In addition, the method comprises determining a content adoption probability according to the watch ability, where the content adoption probability corresponds to a probability of a content being displayed. The method further comprises determining one or more contents to be presented on the electronic billboard based on the content adoption probability. The method additionally comprises presenting the one or more contents on the electronic billboard.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
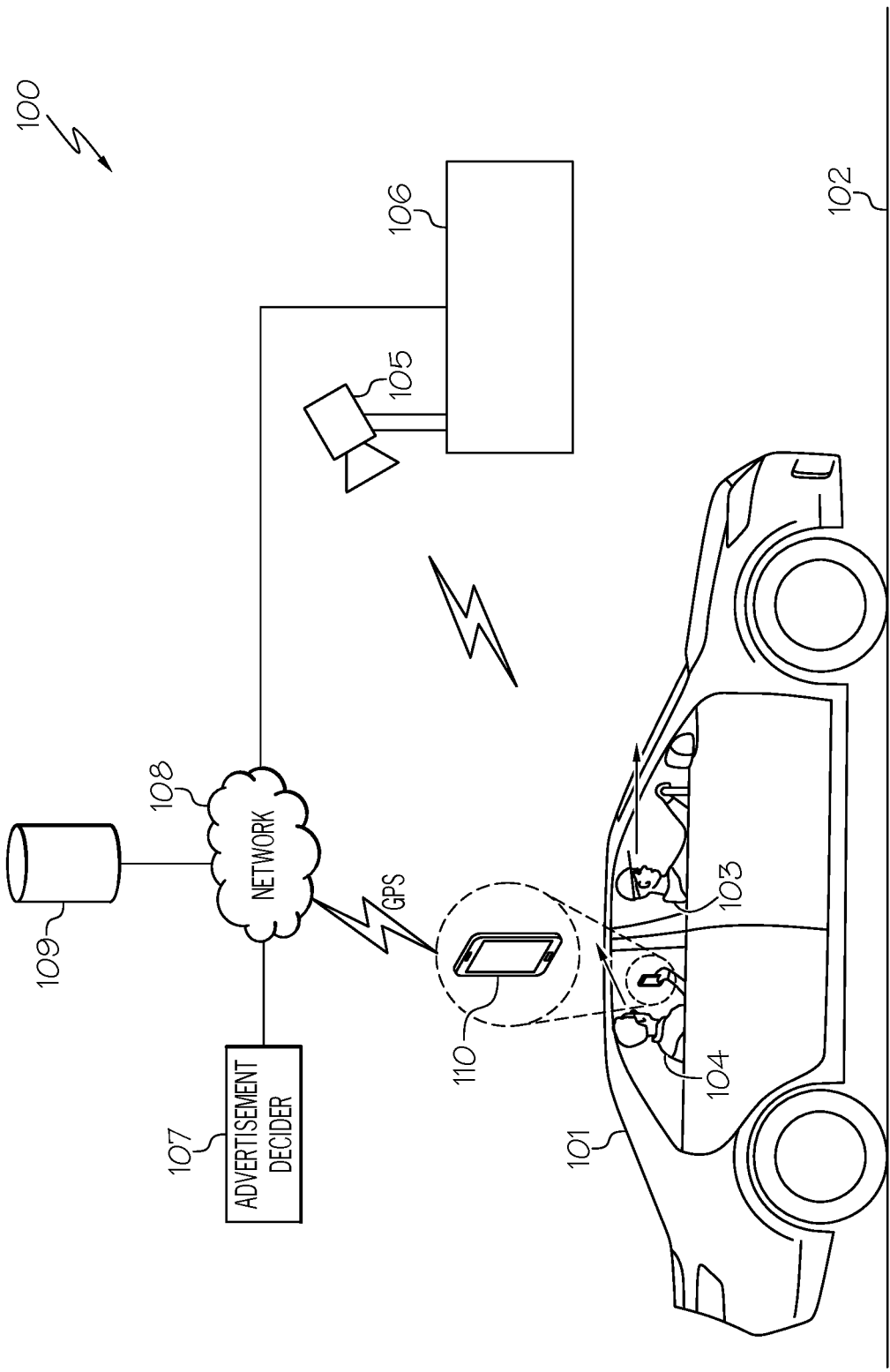
FIG. 1 illustrates a communication system for presenting targeted advertisements to vehicle occupants on electronic billboards in accordance with an embodiment of the present invention.

The present invention comprises a method, system and computer program product for presenting content (e.g., advertisements) to vehicle occupants. In one embodiment of the present invention, an image of the occupants of the vehicle is obtained, where such an image may be obtained from a camera attached to an electronic billboard. The vehicle occupants, such as the driver, are then identified from the image, such as using facial recognition software to match a captured image of the driver with a pre-existing image of the driver. After obtaining the driving history of the driver, which includes any information that indicates a risk posed to the driver in not paying attention to the road, whether from viewing advertisements of a particular topic or otherwise, a risk degree of the driver getting into an accident from viewing an advertisement on the electronic billboard is assessed. A "watch ability" of the vehicle occupants of the vehicle to watch advertisements is calculated, based, at least in part, on the driver's risk degree. "Watch ability," as used herein, refers to the ability of the vehicle occupants to view the advertisement(s) on the electronic billboard taking into consideration the risk posed to the driver getting into an accident from viewing an advertisement on the electronic billboard. If the value of the watch ability exceeds a threshold value, then the advertisement preferences of the vehicle occupants are obtained. "Advertisement preferences," as used herein, include information directed to a vehicle occupant's topics of interest, advertisements of interest, a particular advertisement pattern, such as a sequence of particular advertisements, including a sequence of advertisements on various specified topics, etc. Furthermore, the advertisement adoption probability is determined according to the advertisement preferences of the vehicle occupants and the watch ability. The "advertisement adoption probability," as used herein, refers to a probability of an advertisement being displayed. The advertisements to be presented on the electronic billboard to the vehicle occupants are then determined based on the advertisement adoption probability. The advertisements are then presented on the outdoor electronic billboard. In this manner, advertisements targeted to the vehicle occupants are presented on the electronic billboard while taking into consideration the amount of risk of the driver getting into an accident from presenting such advertisements. By targeting advertisements to the vehicle occupants, such advertisements are more likely to be effective in garnering interest from the vehicle occupants.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with presenting targeted advertisements to vehicle occupants of an automobile on electronic billboards, the principles of the present invention may be applied to any moving vehicle, such as a train, where people may view advertisements on a billboard outside of a moving vehicle. A person of ordinary skill in the art would be capable of applying the principles of the present invention to such implementations. Further, embodiments applying the principles of the present invention to such implementations would fall within the scope of the present invention.

Furthermore, while the following discusses the present invention in connection with presenting targeted advertisements to vehicle occupants on electronic billboards, the principles of the present invention may be applied to presenting targeted advertisements on signs, such as street signs. A person of ordinary skill in the art would be capable of applying the principles of the present invention to such implementations. Further, embodiments applying the principles of the present invention to such implementations would fall within the scope of the present invention.

Additionally, while the following discusses the present invention in connection with presenting targeted advertisements to vehicle occupants on electronic billboards, the principles of the present invention may be applied to presenting other types of content, such as birthday wishes, on electronic billboards. For example, while the following discusses the use of "advertisements," "advertisement preferences," and "advertisement adoption probability," such terms may apply to "content" in the general sense which includes written matter, illustrations and/or music. A person of ordinary skill in the art would be capable of applying the principles of the present invention to such implementations. Further, embodiments applying the principles of the present invention to such implementations would fall within the scope of the present invention.

Referring now to the Figures in detail, FIG. 1 illustrates a communication system 100 for presenting targeted advertisements to vehicle occupants (e.g., driver, passengers) on electronic billboards in accordance with an embodiment of the present invention.

As shown in FIG. 1, system 100 includes a vehicle 101 (e.g., automobile) traveling along a road 102 (e.g., street, highway). The occupants of vehicle 101 include a driver 103 and perhaps a passenger(s) 104, such as shown in FIG. 1.

In one embodiment, an image of the vehicle occupants may be obtained via a camera 105 (also referred to herein as the "tower camera") that may be attached to an electronic billboard 106 configured to display one or more advertisements that are targeted to the occupants of vehicle 101. "Vehicle occupants," as used herein, refer to the driver as well as any passengers of vehicle 101. While FIG. 1 illustrates a single camera 105, it is noted that principles of the present invention are not to be limited to such a depiction and that embodiments of the present invention may include multiple cameras 105.

In one embodiment, camera 105 consists of multiple (e.g., two) near-infrared cameras with spectral sensitivity above (upper band) and below (lower band) the 1.4 μm threshold point, respectively. In one embodiment, during overcast days and during the nighttime, the scene is safely illuminated with an eyesafe near-infrared illuminator. The near-infrared cameras can also provide clear imaging signals even in certain foul weather situations, such as in hazy conditions. In one embodiment, in order to obtain a clear image of the vehicle occupants, the co-registered imaging signals are fused from the lower and upper band cameras. Because of the abrupt change in the reflectance for human skin around 1.4 the fusion of the images results in the intensification of the occupant face silhouettes and the diminution of the background. This increased contrast allows for perfect segmentation that leaves only the face blobs of the vehicle occupants in the final processed image. In one embodiment, such a clean-cut binary image will ensure the reliable and fast operation of the pattern classifier (used to identify an individual associated with the image of that person) that will perform the vehicle occupant detection task as a post-processing calculation. Such processing may be performed by applications stored and executed on advertisement decider 107 (discussed further below).

In one embodiment, images captured by camera 105 are sent to advertisement decider 107 via a network 108 to be processed as discussed further below.

In one embodiment, camera 105 is part of the Xerox® vehicle passenger detection system configured to obtain an image of the vehicle occupants (e.g., driver 103, passenger 104), which is used to identify the vehicle occupants as discussed below. In such an embodiment, camera(s) 105, illuminators (not shown) and the electronics package (include video image processor) (not shown) are attached to electronic billboard 106.

In one embodiment, advertisement decider 107 compares the captured images of the vehicle occupants (captured by camera 105) with images stored in a database 109 of users who had previously registered to participate in having targeted advertisements shown to them on electronic billboards 106. In one embodiment, database 109 is connected to advertisement decider 107 via network 108. In one embodiment, users may register with a service on a website to participate in having targeted advertisements shown to them on electronic billboards 106. The user may provide various information, such as topics of interest, advertisements of interest, the number of vehicle occupants that typically ride in the user's vehicle who may view an advertisement on electronic billboard 106, vehicle information, such as the license plate number, etc. as well as submit an image to be stored in database 109 that is used to identify them when they are traveling along road 102. Information, such as topics of interests and advertisements of interests, is referred to herein as "advertisement preferences." Furthermore, the advertisement preferences of the users may include a particular advertisement pattern, such as a sequence of particular advertisements, including a sequence of advertisements on various specified topics.

In one embodiment, advertisement decider 107 executes applications, such as facial recognition applications, configured to uniquely identify a person by comparing and analyzing patterns based on the person's facial contours shown in the stored and captured images, where the "stored images" refer to the images provided by the user which are stored in database 109 and the "captured images" refer to the images captured by camera 105 which may also be stored in database 109.

In one embodiment, advertisement decider 107 is configured to identify the orientation of the faces of the vehicle occupants (shown by arrows in FIG. 1) captured by camera 105. Such images may be analyzed using the maximum likelihood (ML)-Kalman face orientation estimation or the continuous density Hidden Markov Model (CDHMM) face orientation estimation. Such estimation algorithms are applications stored and executed on advertisement decider 107.

The information pertaining to the orientation of the faces of the vehicle occupants may be stored in database 109 and used by advertisement decider 107 to determine how many vehicle occupants are viewing or potentially able to view advertisement(s) shown on electronic billboard 106. Such information is used by advertisement decider 107 to determine the likelihood that the vehicle occupants will watch or are watching the advertisement(s) on electronic billboard 106, which is one of the factors in calculating the "watch ability" of the vehicle occupants of vehicle 101. For example, if the orientations of the faces are directed to electronic billboard 106, then it may be deduced that those vehicle occupants are viewing or likely to view an advertisement on electronic billboard 106. "Watch ability," as used herein, refers to the ability of the vehicle occupants to view the advertisement(s) on electronic billboard 106 taking into consideration the risk posed to driver 103 in getting into an accident from viewing an advertisement on electronic billboard 106.

Furthermore, as shown in FIG. 1, the vehicle's location may be obtained from global positioning system (GPS) information obtained from one or more of the vehicle occupants, such as via a mobile device 110 in the possession of one of the vehicle occupants. In one embodiment, the GPS information is provided to advertisement decider 107 via network 108 after the user of mobile device 110 has granted permission to provide such information to advertisement decider 107 during the registration process discussed above.

In one embodiment, the speed of vehicle 101 is determined by advertisement decider 107 using such GPS information. In one embodiment, the speed of vehicle 101 is equal to the distance covered divided by the time taken. For example, by using two GPS points (locations), the distance covered by vehicle 101 can be determined corresponding to the distance difference between the two GPS points. The traveling time between such GPS coordinates can be tracked by advertisement decider 107 thereby determining how long it took the vehicle to travel between those two points. The speed of vehicle 101 can then be determined based on the distance traveled between those two points over that time.

Referring again to FIG. 1, advertisement decider 107 is configured to present advertisement(s) on electronic billboard 106 that are targeted to the vehicle occupants while taking into consideration the risk posed to the driver getting into an accident from paying too close attention to the advertisement displayed on electronic billboard 106 as opposed to paying attention to the road as discussed further below. For example, after obtaining an image of driver 103 of vehicle 101 and identifying driver 103 based on matching the image captured by camera 105 with a previously stored image of driver 103, the driver's driving history (also referred to as the driver's driving behavior) may be obtained by advertisement decider 107. The "driver's driving history" or "driver's driving behavior," as used herein, refers to any information that indicates a risk posed to the driver in not paying attention to the road, whether from viewing advertisements of a particular topic or otherwise. Such information may be obtained based on questions presented to driver 103 during registration, such as whether driver 103 talks on his/her cell phone while driving, texting while driving, eating while driving, etc. Such positive answers to such questions may indicate a driver who is more easily distracted. Other information may include traffic violations, such as for failure to pay attention, which may be obtained by advertisement decider 107 from publicly accessible databases storing traffic violations. If driver 103 has a large number of traffic violations, especially for not paying attention, it may indicate that driver 103 is more easily distracted and therefore a higher risk for getting into an accident from viewing an advertisement, such as an advertisement of interest, on electronic billboard 106. A description of the hardware configuration of advertisement decider 107 is provided below in connection with FIG. 2.

Furthermore, database 109 may store various types of information, in addition to the registration information (e.g., topics of interest, advertisements of interest) discussed above as well as images captured by camera 105 and images provided by the vehicle occupants. For example, database 109 may store the advertisements to be presented. Additionally, database 109 may store the presentation patterns of the advertisements, such as which advertisements are to be shown in what order, including in which display section of electronic billboard 106 if electronic billboard 106 has multiple display sections. In another example, database 109 may not only store the user's topics of interest but also the degree of such interests, which may be provided by the user during registration. Furthermore, as discussed above, database 109 may store the number of passengers currently viewing the advertisement(s) shown on electronic billboard 106. Additionally, database 109 may store the number of vehicle occupants that typically ride in vehicle 101 who may view an advertisement on electronic billboard 106, where such information is provided by driver 103 of vehicle 101 during registration. Furthermore, database 109 may store the number of display sections for each electronic billboard 106 alongside road 102.

While the foregoing discusses a single database storing such information, it is noted that the principles of the present invention are not to be limited in such a manner. System 100 may include multiple databases, where each database stores unique information, such as a database storing the user's topics of interest, a database storing advertisements to be presented on electronic billboard 106, a database storing images captured by camera 105, a database storing GPS information for vehicle 101, a database storing driving behavior of various registered users, etc.

Furthermore, system 100 is not to be limited in scope to any one particular architecture. System 100 may include any number of vehicles 101, roads 102, drivers 103, passengers 104, cameras 105, electronic billboards 106, advertisement deciders 107, networks 108, databases 109 and mobile devices 110. For example, system 100 may include several electronic billboards 102 placed alongside road 102.

Figure 2:
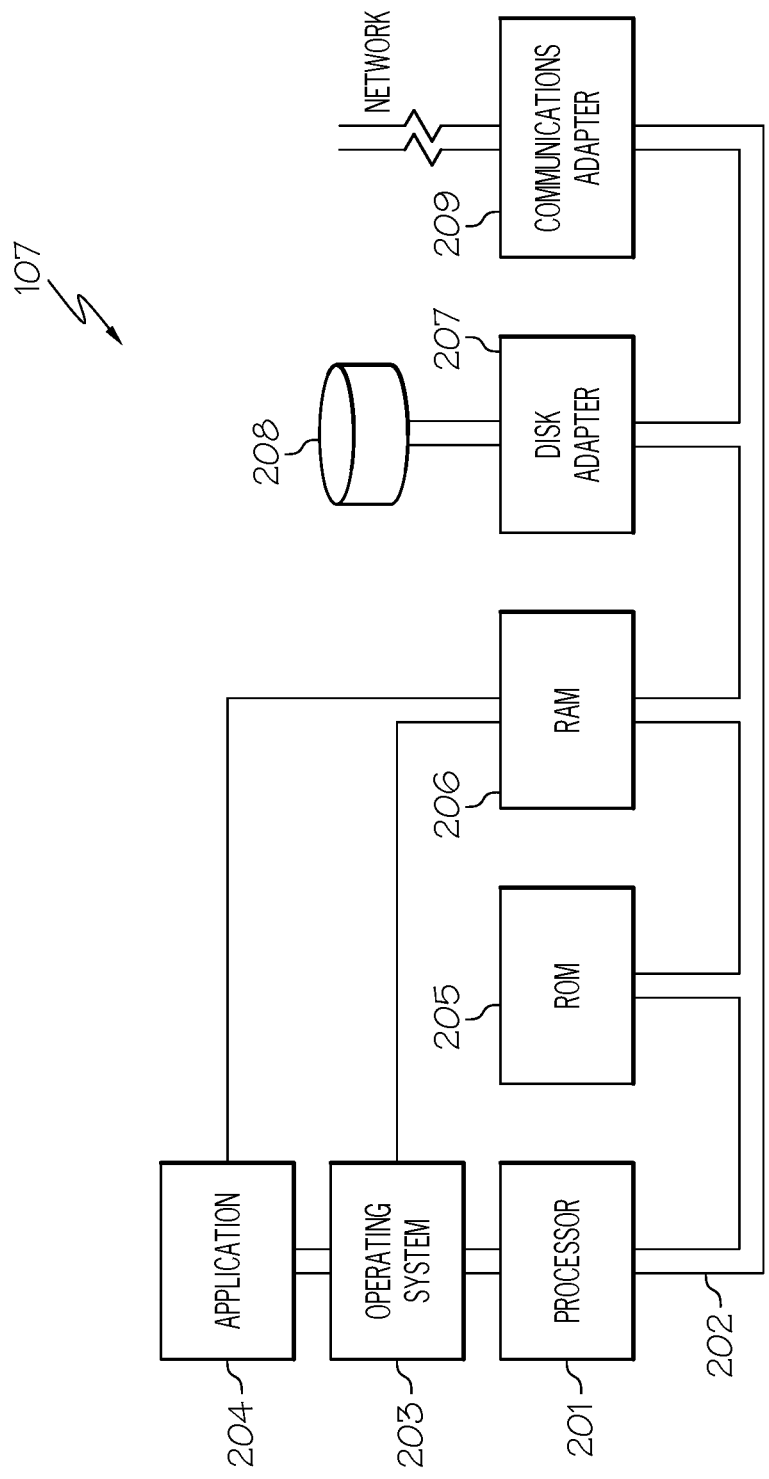
FIG. 2 illustrates an embodiment of the present invention of a hardware configuration of an advertisement decider which is representative of a hardware environment for practicing the present invention.

Referring now to FIG. 2, FIG. 2 illustrates a hardware configuration of advertisement decider 107 (FIG. 1) which is representative of a hardware environment for practicing the present invention. Referring to FIG. 2, advertisement decider 107 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, facial recognition software, orientation estimation programs as well as a program for presenting advertisements on electronic billboard 106 (FIG. 1) that are targeted to the vehicle occupants while taking into consideration the risk posed to the driver getting into an accident from paying too close attention to the advertisement displayed on electronic billboard 106 as opposed to paying attention to the road as discussed below in association with FIGS. 3A-3B and 4-8.

Referring again to FIG. 2, read-only memory ("ROM") 205 is coupled to system bus 202 and includes a basic input/output system ("BIOS") that controls certain basic functions of advertisement decider 107. Random access memory ("RAM") 206 and disk adapter 207 are also coupled to system bus 202. It should be noted that software components including operating system 203 and application 204 may be loaded into RAM 206, which may be advertisement decider's 107 main memory for execution. Disk adapter 207 may be an integrated drive electronics ("IDE") adapter that communicates with a disk unit 208, e.g., disk drive. It is noted that the program for presenting advertisements on electronic billboard 106 that are targeted to the vehicle occupants while taking into consideration the risk posed to the driver getting into an accident from paying too close attention to the advertisement displayed on electronic billboard 106, as discussed below in association with FIGS. 3A-3B and 4-8, may reside in disk unit 208 or in application 204.

Advertisement decider 107 may further include a communications adapter 209 coupled to bus 202. Communications adapter 209 interconnects bus 202 with an outside network (e.g., network 108 of FIG. 1) thereby allowing advertisement decider 107 to communicate with camera 105, electronic billboard 106, database 109 and mobile device 110.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in recent years, electronic billboards (also referred to as "digital billboards") have been used to present advertisements. Electronic billboards are billboards that show varying imagery and text created from computer programs and software. Electronic billboards can be designed to display running text, display several different advertisements from the same company, and even provide several companies a certain time slot during the day. The constantly changing texts ensure maximum impact and wide exposure to target audiences. The ability to schedule advertisements remotely, in combination with flexible real-time scheduling, has allowed for a decrease in traditional upkeep and maintenance costs. While electronic billboards dynamically change advertisements, such advertisements are not necessarily individually targeted to the occupants of a vehicle traveling passed the electronic billboard. As a result, the advertisements may not be effective in garnering the interest of the driver and/or passenger. Furthermore, the advertisements shown on the electronic billboard may pose a risk in the driver getting into an accident from paying too close attention to the advertisement displayed on the electronic billboard as opposed to paying attention to the road. There is currently no means for taking into account the amount of risk that a driver may get into an accident based on not paying attention to the road when presenting advertisements on electronic billboards. That is, there is currently no means for taking into account the risk of distraction of the driver when presenting advertisements on electronic billboards.

Figure 3A:
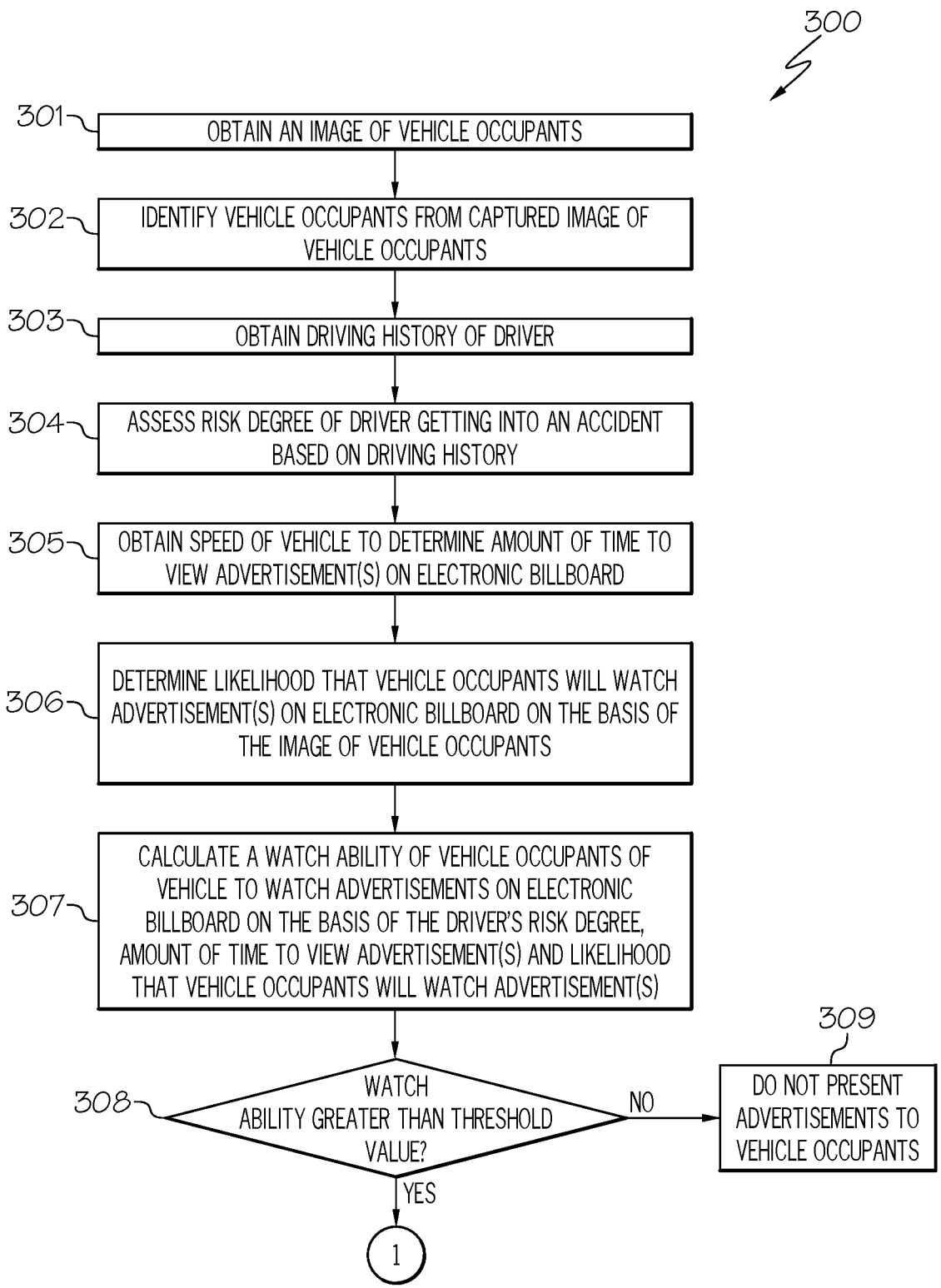
FIGS. 3A-3B are a flowchart of a method for presenting targeted advertisements on electronic billboards to vehicle occupants while taking into account the risk that a driver may get into an accident by not paying attention to the road when presenting the advertisements on the electronic billboards in accordance with an embodiment of the present invention.
Figure 3B:
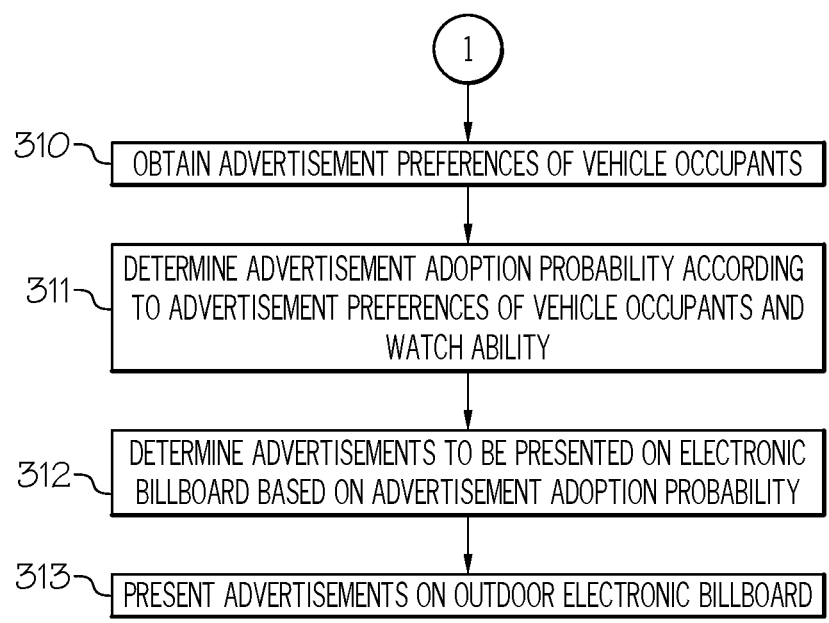
Figure 4:
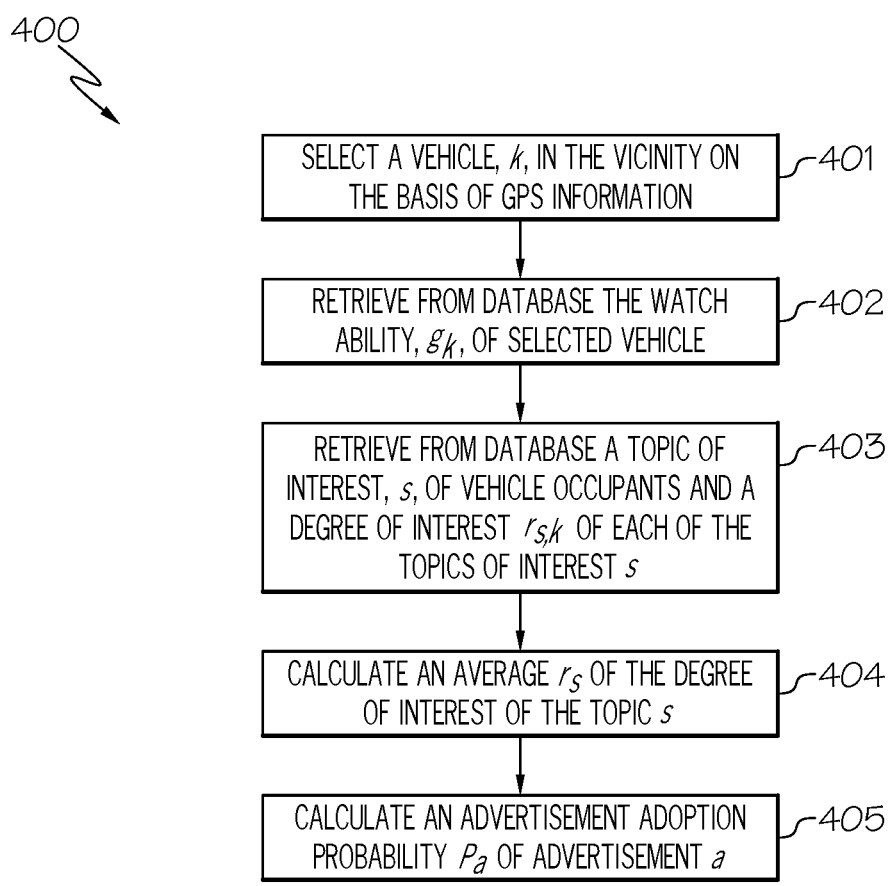
FIG. 4 is a flowchart of a method for calculating advertisement adoption probabilities in accordance with an embodiment of the present invention.
Figure 5:
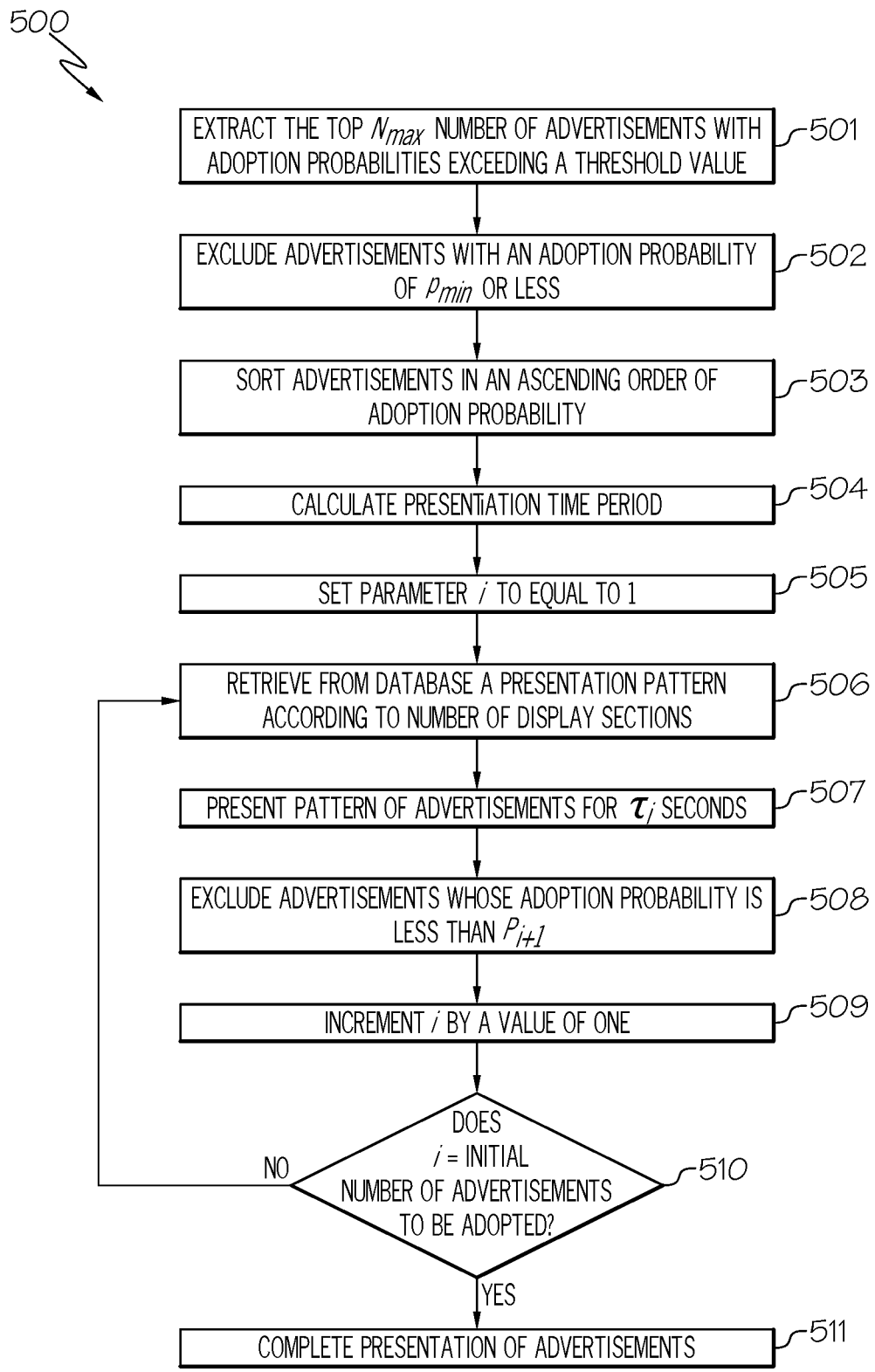
FIG. 5 is a flowchart of a method for presenting advertisements on electronic billboards based on advertisement adoption probabilities, where the presentation time period is assigned according to the advertisement adoption probability, in accordance with an embodiment of the present invention.
Figure 6:
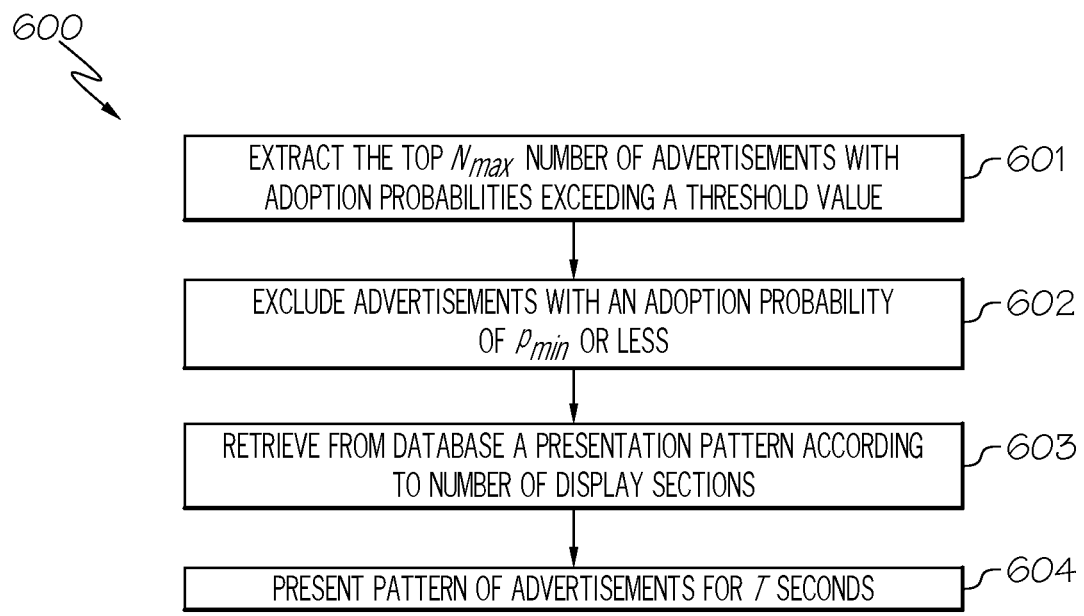
FIG. 6 is a flowchart of a method for presenting advertisements on electronic billboards based on advertisement adoption probabilities, where the presentation time period is not assigned according to the advertisement adoption probability, in accordance with an embodiment of the present invention.
Figure 7:
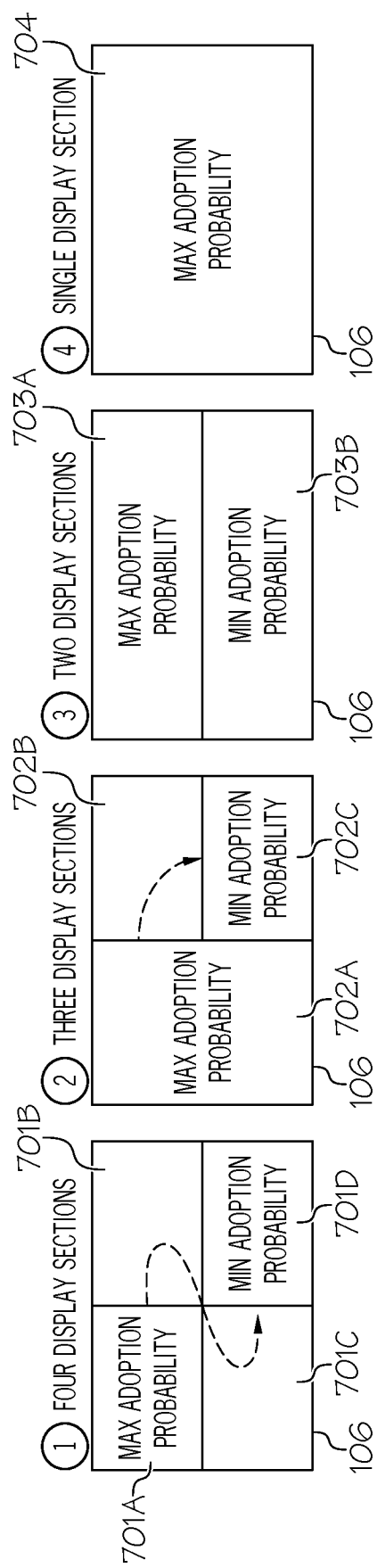
FIG. 7 illustrates the various number of display sections that may exist on an electronic billboard in accordance with an embodiment of the present invention.
Figure 8:
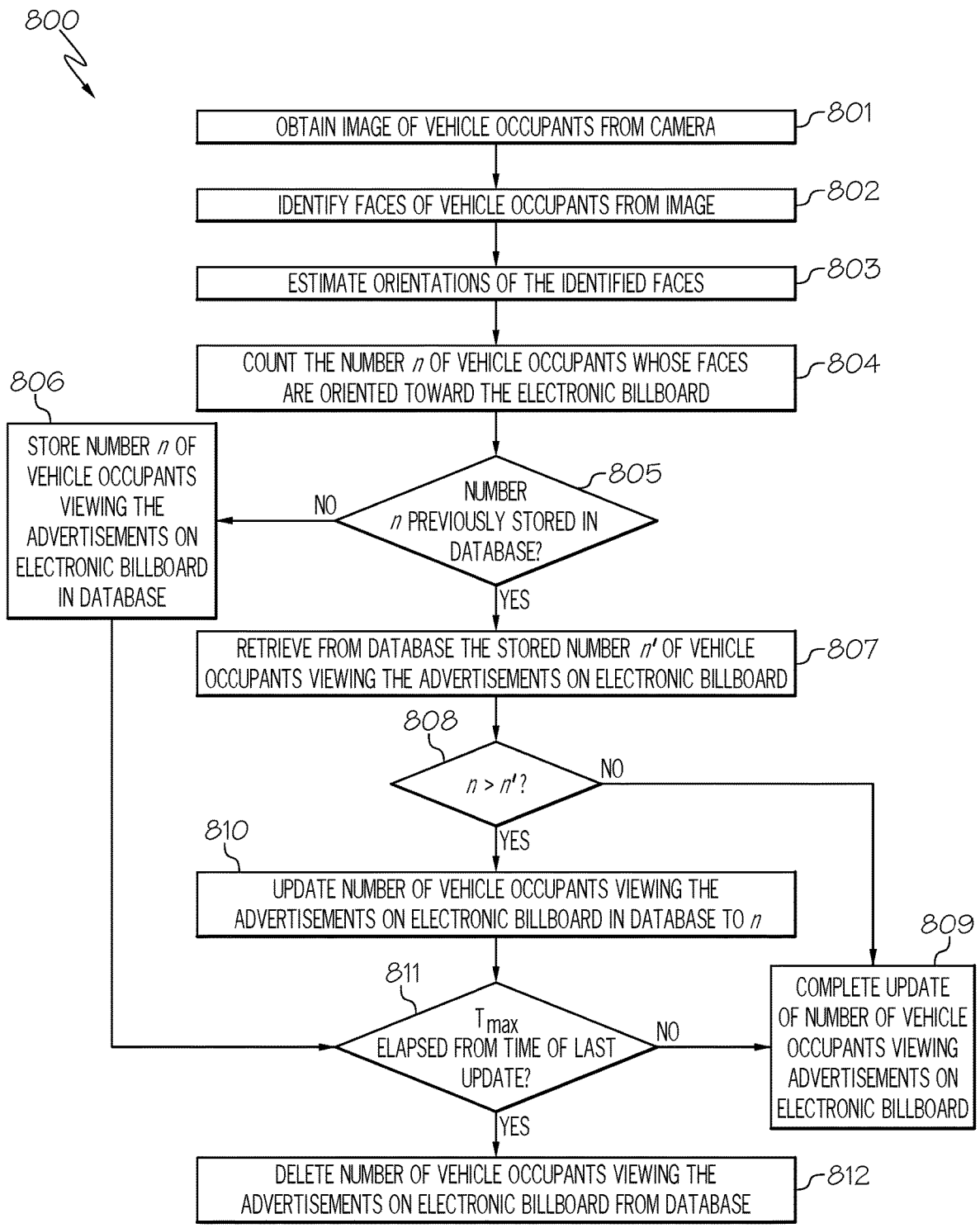
FIG. 8 is a flowchart of a method for updating the number of vehicle occupants viewing the advertisement(s) shown on the electronic billboard in accordance with an embodiment of the present invention.

The embodiments of the present invention provide a means for presenting targeted advertisements on electronic billboards to vehicle occupants while taking into account the risk that a driver may get into an accident by not paying attention to the road when presenting the advertisements on the electronic billboards as discussed below in connection with FIGS. 3A-3B and 4-8. FIGS. 3A-3B are a flowchart of a method for presenting targeted advertisements on electronic billboards to vehicle occupants while taking into account the risk that a driver may get into an accident by not paying attention to the road when presenting the advertisements on the electronic billboards. FIG. 4 is a flowchart of a method for calculating advertisement adoption probabilities. FIG. 5 is a flowchart of a method for presenting advertisements on electronic billboards based on advertisement adoption probabilities, where the presentation time period is assigned according to the advertisement adoption probability. FIG. 6 is a flowchart of a method for presenting advertisements on electronic billboards based on advertisement adoption probabilities, where the presentation time period is not assigned according to the advertisement adoption probability. FIG. 7 illustrates the various number of display sections that may exist on an electronic billboard. FIG. 8 is a flowchart of a method for updating the number of vehicle occupants viewing the advertisement(s) shown on the electronic billboard.

As stated above, FIGS. 3A-3B are a flowchart of a method 300 for presenting targeted advertisements on electronic billboards to vehicle occupants while taking into account the risk that a driver may get into an accident by not paying attention to the road when presenting the advertisements on the electronic billboards in accordance with an embodiment of the present invention.

Referring to FIG. 3A, in conjunction with FIGS. 1-2, in step 301, advertisement decider 107 obtains an image of the occupants of vehicle 101, such as driver 103 and any passengers 104, if applicable. As discussed above, such an image may be obtained from camera 105.

In step 302, advertisement decider 107 identifies the vehicle occupants, including driver 103 of vehicle 101, from the image captured in step 301. As discussed above, in one embodiment, advertisement decider 107 executes applications, such as facial recognition applications, configured to uniquely identify a person by comparing and analyzing patterns based on the person's facial contours shown in the stored and captured images, where the "stored images" refer to the images provided by the user (e.g., driver 103) during the registration process which are stored in database 109 and the "captured images" refer to the images captured by camera 105 which may also be stored in database 109.

In step 303, advertisement decider 107 obtains the driving history of driver 103. As discussed above, in one embodiment, the driver's driving history is stored in database 109 and obtained by advertisement decider 107 via network 108. The "driver's driving history" or "driver's driving behavior," as used herein, refers to any information that indicates a risk posed to the driver in not paying attention to the road, whether from viewing advertisements of a particular topic or otherwise. Such information may obtained based on questions presented to driver 103 during registration, such as whether driver 103 talks on his/her cell phone while driving, texting while driving, eating while driving, etc. Such positive answers to such questions may indicate a driver who is more easily distracted. Other information may include traffic violations, such as for failure to pay attention, which may be obtained by advertisement decider 107 from publicly accessible databases storing traffic violations. If driver 103 has a large number of traffic violations, especially for not paying attention, it may indicate that driver 103 is more easily distracted and therefore a higher risk for getting into an accident.

In step 304, advertisement decider 107 assesses the risk degree of driver 103 based on the driver's driving history. For example, the driver's driving history may indicate traffic violations for failure to pay attention. Such driving history may suggest that the driver is more easily distracted and therefore a higher risk for getting into an accident. In one embodiment, advertisement decider 107 generates a score (d) corresponding to a risk degree based on the analysis of the driver's driving history. Such an analysis may involve natural language processing where keywords, such as "failure to pay attention," are identified in traffic violations or identifying the driver's admission to "eating while driving" in a questionnaire. In one embodiment, the higher the value of the score (d), the greater the risk degree (i.e., the greater the risk that driver 103 will be involved in an accident for failure to pay attention to the road).

In step 305, advertisement decider 107 obtains a speed of vehicle 101 to determine the amount of time to view the advertisement(s) on electronic billboard 106. As discussed above, in one embodiment, the speed of vehicle 101 is determined by advertisement decider 107 using GPS information provided by mobile device 110 of one of the vehicle occupants of vehicle 101. In one embodiment, the speed of vehicle 101 is equal to the distance covered divided by the time taken. For example, by using two GPS points (locations), the distance covered by vehicle 101 can be determined corresponding to the distance difference between the two GPS points. The traveling time between such GPS coordinates can be tracked by advertisement decider 107 thereby determining how long it took the vehicle to travel between those two points. The speed of vehicle 101 can then be determined based on the distance traveled between those two points over that time.

In step 306, advertisement decider 107 determines the likelihood that the vehicle occupants will watch advertisement(s) on electronic billboard 106 on the basis of the image of the vehicle occupants. As discussed above, in one embodiment, advertisement decider 107 is configured to identify the orientation of the faces of the vehicle occupants (shown by arrows in FIG. 1) captured by camera 105. Such images may be analyzed using the maximum likelihood (ML)-Kalman face orientation estimation or the continuous density Hidden Markov Model (CDHMM) face orientation estimation. Such estimation algorithms are applications stored and executed on advertisement decider 107. The information pertaining to the orientation of the faces of the vehicle occupants may be stored in database 109 and used by advertisement decider 107 to determine how many vehicle occupants are viewing or potentially able to view advertisement(s) shown on electronic billboard 106. Such information is used by advertisement decider 107 to determine the likelihood that the vehicle occupants will watch or are watching the advertisement(s) on electronic billboard 106. For example, if the orientations of the faces are directed to electronic billboard 106, then it may be deduced that those vehicle occupants are viewing or likely to view an advertisement on electronic billboard 106.

In step 307, advertisement decider 107 calculates a "watch ability" of the vehicle occupants of vehicle 101 to watch advertisements on electronic billboard 106 on the basis of the driver's risk degree, amount of time the vehicle occupants have to view the advertisement(s) and the likelihood that the vehicle occupants will watch advertisement(s). "Watch ability," as used herein, refers to the ability of the vehicle occupants to view the advertisement(s) on electronic billboard 106 taking into consideration the risk posed to driver 103 getting into an accident from viewing an advertisement on electronic billboard 106. Such a watch ability is a real-time watch ability as discussed herein.

In one embodiment, the watch ability (g) is the following:

$$g=(n-d)/v$$

where n corresponds to the number of vehicle occupants who are likely to watch advertisement(s) on electronic billboard 106 based on the orientation of the faces of the vehicle occupants as discussed above in step 306, d corresponds to the driver's risk degree (see step 304) and v corresponds to the speed of vehicle 101 (see step 305). In one embodiment, the number of vehicle occupants who are likely to watch advertisement(s) on electronic billboard 106 based on the orientation of the faces of the vehicle occupants may be stored in database 109. If such information is not already stored in database 109, then, in one embodiment, advertisement decider 107 sets that value to equal 0. In one embodiment, if the velocity of vehicle 101 is not greater than a minimum amount of speed, such as a value regarded as the vehicle being stopped, then, in one embodiment, advertisement decider 107 sets that value to equal a value of 1.

In one embodiment, the value of the watch ability is stored in database 109.

In step 308, advertisement decider 107 determines whether the value of the watch ability is greater than a threshold value, which may be user-specified.

If the watch ability is not greater than a threshold value, then, in step 309, advertisement decider 107 does not present advertisements to the vehicle occupants on electronic billboard 106. In this manner, driver safety is taken into consideration, and by not showing a potentially distracting advertisement, an accident may have been prevented.

Referring to FIG. 3B, in conjunction with FIGS. 1-2, if, however, the watch ability is greater than a threshold value, then, in step 310, advertisement decider 107 obtains the advertisement preferences of the vehicle occupants. "Advertisement preferences," as used herein, include information directed to a vehicle occupant's topics of interest, advertisements of interest, a particular advertisement pattern, such as a sequence of particular advertisements, including a sequence of advertisements on various specified topics, etc. Such information may have been provided by the vehicle occupant upon registration.

In step 311, advertisement decider 107 determines the advertisement adoption probability according to the advertisement preferences of the vehicle occupants and the watch ability. The "advertisement adoption probability," as used herein, refers to a probability of an advertisement being displayed. A method of calculating the advertisement adoption probability is discussed below in connection with FIG. 4.

FIG. 4 is a flowchart of a method 400 for calculating advertisement adoption probabilities in accordance with an embodiment of the present invention.

Referring to FIG. 4, in conjunction with FIGS. 1-2 and 3A-3B, in step 401, advertisement decider 107 selects a vehicle 101, k, in the vicinity on the basis of GPS information obtained in step 305 (obtained in step 305 to determine the speed of vehicle 101).

In step 402, advertisement decider 107 retrieves from database 109 the watch ability, $g_k$, of the selected vehicle 101.

In step 403, advertisement decider 107 retrieves from database 109 a topic of interest, s, of the vehicle occupants and a degree of interest $r_{s,k}$ of each of the topics of interest s. In one embodiment, the degree of interest may be determined by advertisement decider 107 based on information provided by the vehicle occupant during registration, such as indicating how strong of an interest (e.g., indicating a value from 0 to 10, where 10 indicates the highest interest) on various topics (e.g., sports, travel). In this manner, advertisement decider 107 may determine which interests, and as a result, which advertisements that most, if not at all, of the vehicle occupants have an interest in viewing. Furthermore, user preferences of multiple vehicle occupants are utilized and integrated as discussed below.

In step 404, advertisement decider 107 calculates an average $r_s$ of the degree of interest of the topic s. In one embodiment, the average of the degree of interest equals:

$$r_s = \frac{\sum_k g_k r_{s,k}}{\sum_k g_k} \tag{1}$$

In step 405, advertisement decider 107 calculates an advertisement adoption probability $P_a$ of advertisement a as shown below:

$$p_a = \frac{\sum_{s \in S_a} r_s}{\sum_{s \in S} r_s} \tag{2}$$

where S is a set of all topics and $S_a$ is a set of topics related to advertisement a.

Returning to FIG. 3B, in conjunction with FIGS. 1-2 and 4, in step 312, advertisement decider 107 determines the advertisements to be presented on electronic billboard 106 to the vehicle occupants based on the advertisement adoption probability.

In step 313, advertisement decider 107 presents the advertisements on outdoor electronic billboard 106.

In this manner, advertisements targeted to the vehicle occupants are presented on electronic billboard 106 while taking into consideration the amount of risk of driver 103 getting into an accident from presenting such advertisements. By targeting advertisements to the vehicle occupants, such advertisements are more likely to be effective in garnering interest from the vehicle occupants.

A discussion regarding presenting advertisements on electronic billboards 106 based on the advertisement adoption probabilities is provided below in connection with FIGS. 5-6.

FIG. 5 is a flowchart of a method 500 for presenting advertisements on electronic billboards 106 based on advertisement adoption probabilities, where the presentation time period is assigned according to the advertisement adoption probability, in accordance with an embodiment of the present invention.

Referring to FIG. 5, in conjunction with FIGS. 1-2, 3A-3B and 4, in step 501, advertisement decider 107 extracts the top $N_{max}$ number of advertisements with adoption probabilities exceeding a threshold value, which may be user-specified, where $N_{max}$ is the maximum number of advertisements to be adopted.

In step 502, advertisement decider 107 excludes advertisements with an adoption probability of $p_{min}$ or less, where $p_{min}$ is the minimum adoption probability of advertisement to be adopted.

In step 503, advertisement decider 107 sorts the advertisements in an ascending order of adoption probability.

In step 504, advertisement decider 107 calculates the presentation time period ($\tau_i$) as shown below:

$$\tau_i = \frac{T p_i}{\sum_{t=1}^{N} p_i} \tag{3}$$

where N corresponds to the initial number of advertisements to be adopted, T corresponds to the maximum time period of presentation on electronic billboard 106, and $p_i$ corresponds to the adoption probability of advertisement i.

In step 505, advertisement decider 107 sets the parameter i to equal the value of 1.

In step 506, advertisement decider 107 retrieves from database 109 a presentation pattern according to the number of display sections on electronic billboard 106.

In step 507, advertisement decider 107 presents a pattern of advertisements for $\tau_i$ seconds In step 508, advertisement decider 107 excludes the advertisements whose adoption probability is less than $P_{i+1}$.

In step 509, advertisement decider 107 increments i by a value of one.

In step 510, a determination is made by advertisement decider 107 as to whether i equals the initial number of advertisements to be adopted.

If i does not equal the initial number of advertisements to be adopted, then, in step 506, advertisement decider 107 retrieves from database 109 a next presentation pattern according to the number of display sections on electronic billboard 106.

If, however, i does equal the initial number of advertisements to be adopted, then, in step 511, advertisement decider 107 completes the presentation of advertisements on electronic billboard 106.

An alternative method for presenting advertisements is discussed below in connection with FIG. 6.

FIG. 6 is a flowchart of a method 600 for presenting advertisements on electronic billboards 106 based on advertisement adoption probabilities, where the presentation time period is not assigned according to the advertisement adoption probability, in accordance with an embodiment of the present invention.

Referring now to FIG. 6, in conjunction with FIGS. 1-2, 3A-3B and 4, in step 601, advertisement decider 107 extracts the top $N_{max}$ number of advertisements with adoption probabilities exceeding a threshold value, which may be user-specified, where $N_{max}$ is the maximum number of advertisements to be adopted.

In step 602, advertisement decider 107 excludes advertisements with an adoption probability of $p_{min}$ or less, where $p_{min}$ is the minimum adoption probability of advertisement to be adopted.

In step 603, advertisement decider 107 retrieves from database 109 a presentation pattern according to the number of display sections on electronic billboard 106.

In step 604, advertisement decider 107 presents the pattern of advertisements for T seconds, where T is the maximum time period of presentation on electronic billboard 106.

As discussed above, electronic billboard 106 may include various display sections as shown in FIG. 7.

FIG. 7 illustrates the various number of display sections that may exist on electronic billboard 106 in accordance with an embodiment of the present invention.

Referring to FIG. 7, electronic billboard 106 may include four display sections 701A-701D, where section 701A corresponds to the maximum adoption probability, followed by section 701B corresponding to the next maximum adoption probability followed by section 701C corresponding to the next maximum adoption probability followed by section 701D corresponding to the minimum adoption probability. Sections 701A-701D may collectively or individually be referred to as sections 701 or section 701, respectively. In one embodiment, each section 701 may have a unique presentation pattern of advertisements. In one embodiment, the presentation patterns of advertisements that are most desired to be watched by the vehicle occupants based, at least in part, on the preferences of the vehicle occupants, are shown in sections with the greatest adoption probability. In one embodiment, the presentation patterns of advertisements are presented in particular sections 701 of electronic billboard 106 based on the orientation of the vehicle occupants. For example, advertisement presentation pattern #1 may be shown on section 701A which is targeted to passenger #1 whose face orientation is directed to section 701A and advertisement presentation pattern #2 is shown on section 701B which is targeted to passenger #2 whose face orientation is directed to section 701B. As discussed above, the presentation pattern of advertisements is based, at least in part, on the topics or advertisements of interests of the user(s) (e.g., passenger(s) of vehicle 101).

Furthermore, as shown in FIG. 7, electronic billboard 106 may include three display sections 702A-702C, where section 702A corresponds to the maximum adoption probability, followed by section 702B corresponding to the next maximum adoption probability followed by section 702C corresponding to the minimum adoption probability. Sections 702A-702C may collectively or individually be referred to as sections 702 or section 702, respectively. As discussed above, in one embodiment, each section 702 may have a unique presentation pattern of advertisements. In one embodiment, the presentation patterns of advertisements that are most desired to be watched by the vehicle occupants are shown in sections with the greatest adoption probability. In one embodiment, the presentation patterns of advertisements are presented in particular sections 702 of electronic billboard 106 based on the orientation of the vehicle occupants as discussed above.

Additionally, as shown in FIG. 7, electronic billboard 106 may include two display sections 703A-703B, where section 703A corresponds to the maximum adoption probability and section 703B corresponds to the minimum adoption probability. Sections 703A-703B may collectively or individually be referred to as sections 703 or section 703, respectively. As discussed above, in one embodiment, each section 703 may have a unique presentation pattern of advertisements. In one embodiment, the presentation pattern of advertisements that is most desired to be watched by the vehicle occupants is shown in the section with the greatest adoption probability. In one embodiment, the presentation patterns of advertisements are presented in particular sections 703 of electronic billboard 106 based on the orientation of the vehicle occupants as discussed above.

Furthermore, as shown in FIG. 7, electronic billboard 106 may include a single display section 704.

In one embodiment, the presentation pattern of advertisements may be updated based on updating the number of the vehicle occupants viewing the advertisement(s) on electronic billboard 106 as discussed below.

FIG. 8 is a flowchart of a method 800 for updating the number of vehicle occupants viewing the advertisement(s) shown on electronic billboard 106 in accordance with an embodiment of the present invention.

Referring to FIG. 8, in conjunction with FIGS. 1-2, 3A-3B and 4-7, in step 801, advertisement decider 107 obtains the image of the vehicle occupants from camera 105 as discussed above in connection with step 301.

In step 802, advertisement decider 107 identifies the faces of the vehicle occupants from the captured image as discussed above in connection with step 302.

In step 803, advertisement decider 107 estimates the orientations of the identified faces as discussed above in connection with step 306.

In step 804, advertisement decider 107 counts the number n of vehicle occupants whose faces are oriented toward electronic billboard 106.

In step 805, a determination is made by advertisement decider 107 as to whether the number n of vehicle occupants whose faces are oriented toward electronic billboard 106 has been previously stored in database 109.

If the number n of vehicle occupants whose faces are oriented toward electronic billboard 106 has not previously been stored in database 109, then, in step 806, advertisement decider 107 stores the number (n) of vehicle occupants viewing the advertisements on electronic billboard 106 in database 109.

If, however, the number n of vehicle occupants whose faces are oriented toward electronic billboard 106 has previously been stored in database 109, then, in step 807, advertisement decider 107 retrieves from database 109 the stored number n' of vehicle occupants viewing the advertisements on electronic billboard 106.

In step 808, a determination is made by advertisement decider 107 as to whether n>n.

If n is not greater than n', then, in step 809, advertisement decider 107 completes the update of the number of vehicle occupants viewing advertisements on electronic billboard 106.

If, however, n is greater than n', then, in step 810, advertisement decider 107 updates the number of vehicle occupants viewing the advertisements on electronic billboard 106 in database 109 to n.

Upon storing stores the number (n) of vehicle occupants viewing the advertisements on electronic billboard 106 in database 109 in step 806 or upon updating the number of vehicle occupants viewing the advertisements on electronic billboard 106 in database 109 to n in step 810, a determination is made in step 811 by advertisement decider 107 as to whether $T_{max}$ has elapsed from the time of the last update.

If $T_{max}$ has not elapsed from the time of the last update, then advertisement decider 107 completes the update of the number of vehicle occupants viewing advertisements on electronic billboard 106 in step 809.

If, however, $T_{max}$ has elapsed from the time of the last update, then, in step 812, advertisement decider 107 deletes the number of vehicle occupants viewing the advertisements on electronic billboard 106 from database 109.

As discussed above, embodiments of the present invention provide the means for presenting targeted advertisements on electronic billboards to vehicle occupants while taking into account the risk that a driver may get into an accident by not paying attention to the road when presenting the advertisements on the electronic billboards.

In one embodiment, embodiments of the present invention may present a recommended destination for vehicle 101 (e.g., restaurant, store) on electronic billboard 106 based on the location of vehicle 101 (obtained from GPS information) and the topics of interests of the vehicle occupants.

Furthermore, the present invention improves the technology or technical field involving advertising on electronic billboards. As discussed above, in recent years, electronic billboards (also referred to as "digital billboards") have been used to present advertisements. Electronic billboards are billboards that show varying imagery and text created from computer programs and software. Electronic billboards can be designed to display running text, display several different advertisements from the same company, and even provide several companies a certain time slot during the day. The constantly changing texts ensure maximum impact and wide exposure to target audiences. The ability to schedule advertisements remotely, in combination with flexible real-time scheduling, has allowed for a decrease in traditional upkeep and maintenance costs. While electronic billboards dynamically change advertisements, such advertisements are not necessarily individually targeted to the occupants of a vehicle traveling passed the electronic billboard. As a result, the advertisements may not be effective in garnering the interest of the driver and/or passenger. Furthermore, the advertisements shown on the electronic billboard may pose a risk in the driver getting into an accident from paying too close attention to the advertisement displayed on the electronic billboard as opposed to paying attention to the road. There is currently no means for taking into account the amount of risk that a driver may get into an accident based on not paying attention to the road when presenting advertisements on electronic billboards. That is, there is currently no means for taking into account the risk of distraction of the driver when presenting advertisements on electronic billboards.

The present invention improves such technology by taking into account the amount of risk that a driver may get into an accident based on not paying attention to the road when presenting advertisements on electronic billboards. In certain situations, advertisements may not be presented on the electronic billboard when the risk degree of the driver is too high thereby preventing a potential accident from occurring. In this manner, there is an improvement in the technical field of advertising on electronic billboards.

Additionally, by presenting targeted advertisements to the vehicle occupants, such advertisements are more likely to be effective in garnering interest from the vehicle occupants. In this manner, there is an improvement in the technical field of advertising on electronic billboards.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for presenting content to vehicle occupants, the computer program product comprising a computer readable storage medium having program code embodied therewith, the program code comprising the programming instructions for:

obtaining, by a content decider, an image of occupants of a vehicle from a camera connected to said content decider via a network, wherein said vehicle occupants comprise a driver of said vehicle;

identifying, by said content decider, said vehicle occupants from said image;

obtaining, by said content decider, a driving history of said driver of said vehicle;

assessing, by said content decider, a risk degree of said driver getting into an accident based on said driving history using natural language processing;

generating, by said content decider, a value corresponding to said assessed risk degree of said driver getting into said accident;

calculating, by said content decider, a watch ability of said vehicle occupants of said vehicle to watch contents on an electronic billboard based on said risk degree of said driver getting into said accident;

determining, by said content decider, a content adoption probability according to said watch ability, wherein said content adoption probability corresponds to a probability of a content being displayed;

determining, by said content decider, one or more contents to be presented on said electronic billboard based on said content adoption probability;

presenting, by said content decider, said one or more contents on said electronic billboard in response to said watch ability exceeding a threshold value; and not presenting, by said content decider, said one or more contents on said electronic billboard in response to said watch ability not exceeding said threshold value thereby taking into consideration driver safety to prevent a potential accident.

2. The computer program product as recited in claim 1, wherein the program code further comprises the programming instructions for:

obtaining content preferences of said vehicle occupants in response to a value of said watch ability exceeding a threshold value; and determining said content adoption probability according to said content preferences of said vehicle occupants and said watch ability.

3. The computer program product as recited in claim 1, wherein the program code further comprises the programming instructions for:

obtaining a speed of said vehicle to estimate an amount of time to view contents on said electronic billboard;

determining a likelihood that said vehicle occupants will watch said contents on said electronic billboard based on said image of said vehicle occupants; and calculating said watch ability of said vehicle occupants of said vehicle to watch said contents on said electronic billboard based on said risk degree of said driver getting into said accident, said estimated amount of time to view said contents on said electronic billboard and said likelihood that said vehicle occupants will watch said contents on said electronic billboard.

4. The computer program product as recited in claim 3, wherein said likelihood that said vehicle occupants will watch said contents on said electronic billboard is determined based on identifying orientation of faces of said vehicle occupants, wherein said orientation is determined by analyzing said image of occupants of said vehicle using maximum likelihood Kalman face orientation estimation or continuous density Hidden Markov Model face orientation estimation.

5. The computer program product as recited in claim 1, wherein said electronic billboard is divided into one or more display sections, wherein each of said one or more display sections is assigned a content adoption probability, wherein each of said one or more display sections has a unique presentation pattern of one or more contents.

6. The computer program product as recited in claim 1, wherein the program code further comprises the programming instructions for:

obtaining a second image of said vehicle occupants;
identifying faces of said vehicle occupants from said second image;
estimating orientations of said identified faces;
determining number of vehicle occupants whose faces are oriented towards said electronic billboard; and
updating number of vehicle occupants viewing said one or more contents on said electronic billboard based on said determined number of vehicle occupants whose faces are oriented towards said electronic billboard in response to said determined number of vehicle occupants whose faces are oriented towards said electronic billboard being greater than a number of vehicle occupants viewing said one or more contents on said electronic billboard that is stored in a database.

7. The computer program product as recited in claim 1, wherein said one or more contents are displayed on said electronic billboard in a presentation pattern.

8. A content decider, comprising:

a memory for storing a computer program for presenting content to vehicle occupants; and a processor connected to said memory, wherein said processor is configured to execute the program instructions of the computer program comprising:

obtaining an image of occupants of a vehicle from a camera connected to said content decider via a network, wherein said vehicle occupants comprise a driver of said vehicle;

identifying said vehicle occupants from said image;

obtaining a driving history of said driver of said vehicle;

assessing a risk degree of said driver getting into an accident based on said driving history using natural language processing;

generating a value corresponding to said assessed risk degree of said driver getting into said accident;

calculating a watch ability of said vehicle occupants of said vehicle to watch contents on an electronic billboard based on said risk degree of said driver getting into said accident;

determining a content adoption probability according to said watch ability, wherein said content adoption probability corresponds to a probability of a content being displayed;

determining one or more contents to be presented on said electronic billboard based on said content adoption probability;

presenting, by said content decider, said one or more contents on said electronic billboard in response to said watch ability exceeding a threshold value; and not presenting, by said content decider, said one or more contents on said electronic billboard in response to said watch ability not exceeding said threshold value thereby taking into consideration driver safety to prevent a potential accident.

9. The content decider as recited in claim 8, wherein the program instructions of the computer program further comprise:

obtaining content preferences of said vehicle occupants in response to a value of said watch ability exceeding a threshold value; and determining said content adoption probability according to said content preferences of said vehicle occupants and said watch ability.

10. The content decider as recited in claim 8, wherein the program instructions of the computer program further comprise:

obtaining a speed of said vehicle to estimate an amount of time to view contents on said electronic billboard;

determining a likelihood that said vehicle occupants will watch said contents on said electronic billboard based on said image of said vehicle occupants; and calculating said watch ability of said vehicle occupants of said vehicle to watch said contents on said electronic billboard based on said risk degree of said driver getting into said accident, said estimated amount of time to view said contents on said electronic billboard and said likelihood that said vehicle occupants will watch said contents on said electronic billboard.

11. The content decider as recited in claim 10, wherein said likelihood that said vehicle occupants will watch said contents on said electronic billboard is determined based on identifying orientation of faces of said vehicle occupants, wherein said orientation is determined by analyzing said image of occupants of said vehicle using maximum likelihood Kalman face orientation estimation or continuous density Hidden Markov Model face orientation estimation.

12. The content decider as recited in claim 8, wherein said electronic billboard is divided into one or more display sections, wherein each of said one or more display sections is assigned a content adoption probability, wherein each of said one or more display sections has a unique presentation pattern of one or more contents.

13. The content decider as recited in claim 8, wherein the program instructions of the computer program further comprise:
   obtaining a second image of said vehicle occupants;
   identifying faces of said vehicle occupants from said second image;
   estimating orientations of said identified faces;
   determining number of vehicle occupants whose faces are oriented towards said electronic billboard; and
   updating number of vehicle occupants viewing said one or more contents on said electronic billboard based on said determined number of vehicle occupants whose faces are oriented towards said electronic billboard in response to said determined number of vehicle occupants whose faces are oriented towards said electronic billboard being greater than a number of vehicle occupants viewing said one or more contents on said electronic billboard that is stored in a database.

14. The content decider as recited in claim 8, wherein said one or more contents are displayed on said electronic billboard in a presentation pattern.

15. The computer program product as recited in claim 1, wherein said driving history of said driver of said vehicle comprises information that indicates a risk posed to said driver in not paying attention to a road, wherein said information is obtained based on questions presented to said driver during registration.

16. The computer program product as recited in claim 1, wherein said watch ability (g) equals (n d)/v, wherein said n corresponds to a number of said vehicle occupants to watch said one or more contents on said electronic billboard based on orientation of faces of said vehicle occupants, wherein said d corresponds to said risk degree of said driver, wherein said v corresponds to a speed of said vehicle.

17. The computer program product as recited in claim 5, wherein each of said one or more display sections displays said unique presentation pattern of one or more contents targeted to a vehicle occupant of said vehicle based on orientation of said vehicle occupant.

18. The content decider as recited in claim 8, wherein said driving history of said driver of said vehicle comprises information that indicates a risk posed to said driver in not paying attention to a road, wherein said information is obtained based on questions presented to said driver during registration.

19. The content decider as recited in claim 8, wherein said watch ability (g) equals (n−d)/v, wherein said n corresponds to a number of said vehicle occupants to watch said one or more contents on said electronic billboard based on orientation of faces of said vehicle occupants, wherein said d corresponds to said risk degree of said driver, wherein said v corresponds to a speed of said vehicle.

20. The content decider as recited in claim 12, wherein each of said one or more display sections displays said unique presentation pattern of one or more contents targeted to a vehicle occupant of said vehicle based on orientation of said vehicle occupant.

\* \* \* \* \*